United States Patent [19]

Tezuka

[11] 4,383,747
[45] May 17, 1983

[54] WINDING UP DEVICE FOR CAMERA

[75] Inventor: Nobuo Tezuka, Tokyo, Japan

[73] Assignee: Canon Kabushiki Kaisha, Tokyo, Japan

[21] Appl. No.: 283,882

[22] Filed: Jul. 16, 1981

[30] Foreign Application Priority Data

Jul. 23, 1980 [JP] Japan ........................... 55-104892[U]
Jul. 25, 1980 [JP] Japan ................................ 55-102578
Aug. 8, 1980 [JP] Japan ................................ 55-108840

[51] Int. Cl.³ ........................................... G03B 17/42
[52] U.S. Cl. .................................. 354/173; 354/206; 354/213; 354/214
[58] Field of Search ............... 354/171, 173, 204, 205, 354/206, 213, 214

[56] References Cited

U.S. PATENT DOCUMENTS 4,174,168 11/1979 Yamashita ........................... 354/206
4,309,097 1/1982 Stemme ................................ 354/173

Primary Examiner—William B. Perkey
Attorney, Agent, or Firm—Toren, McGeady and Stanger

[57] ABSTRACT

Driving power of an electric motor is transmitted to wind up a photographic film on a spool and to charge the shutter and other mechanisms associated therewith. When the spool has wound up the film by one frame, the transmission of the driving power to the spool is cut off through a clutch mechanism. After the charge member has completed its operation of charging the shutter and the motor is de-energized, the clutch mechanism is rendered effective in response to return of the charge member to the initial position, whereby the transmission of the driving power to the spool is again ready to be performed.

10 Claims, 5 Drawing Figures

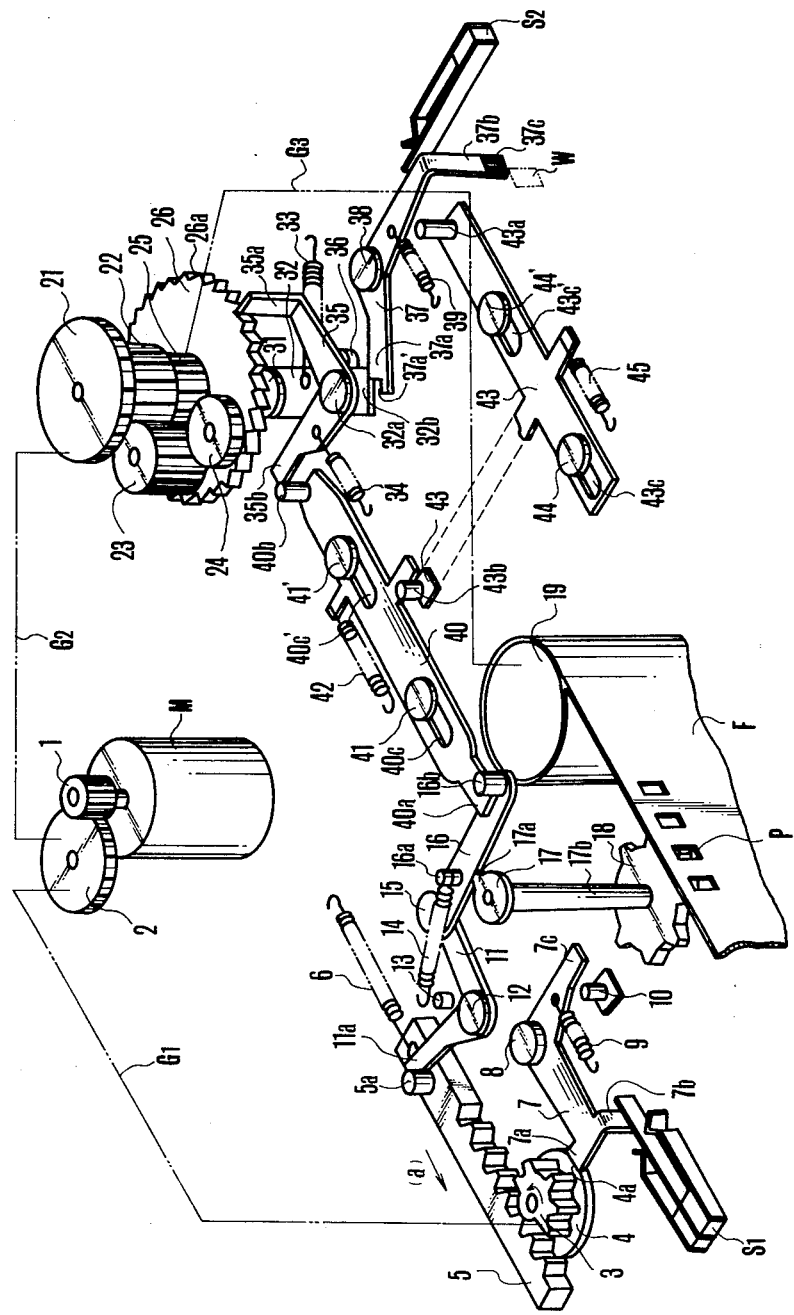

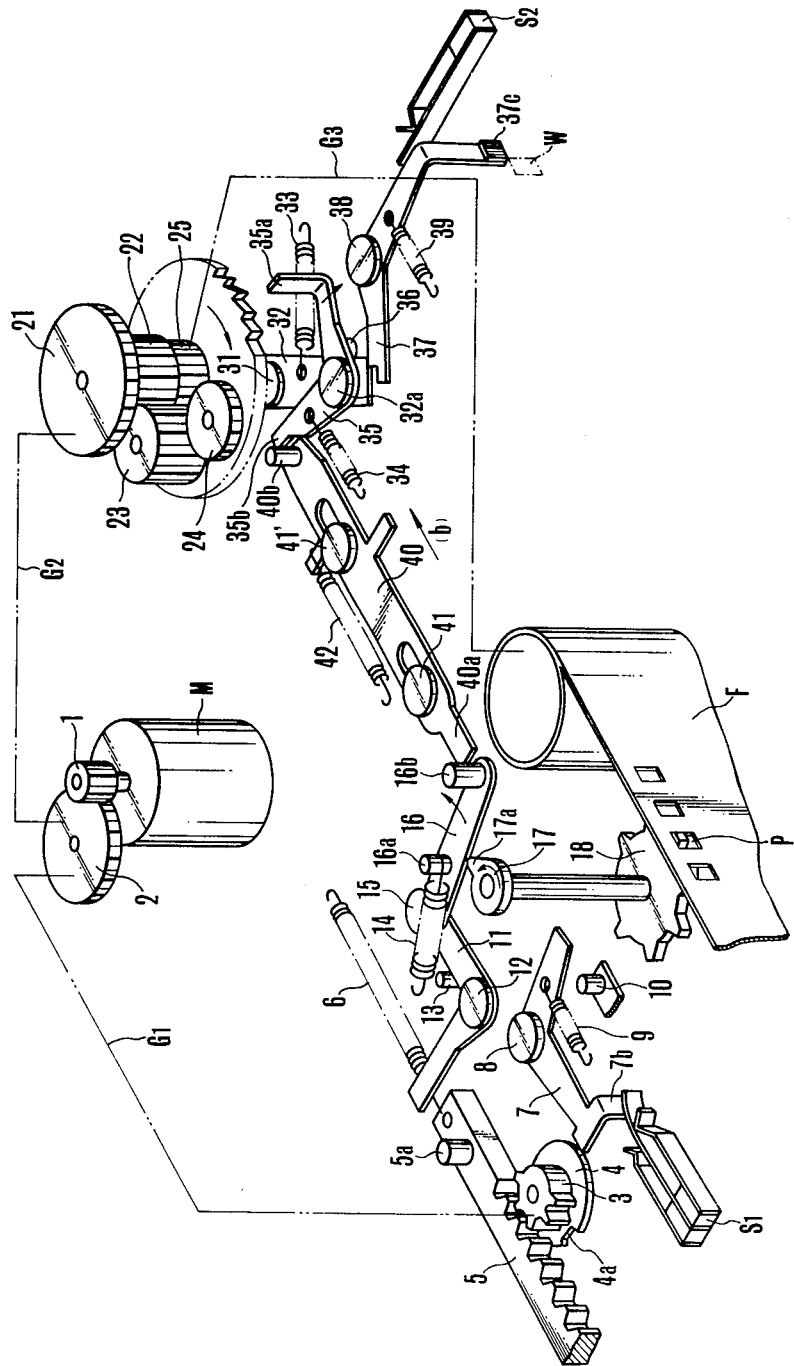

WINDING UP DEVICE FOR CAMERA

BACKGROUND OF THE INVENTION

1. Field of the Invention

This invention relates to winding devices for cameras, and more particularly to a winding device for a camera such that when the exposure is terminated, winding of the photographic film and charging of the shutter and mechanisms associated therewith are performed by the action of one series of driving power so that the next exposure is ready to be performed.

2. Description of the Prior Art

In general, the winding device in a camera must change the angle of rotation of the spool for one-frame advancement of the film as the number of film frames exposed increases. This is because the diameter of the film wound on the spool is increased with decrease in the angle of rotation of the spool to advance the film through the length of one frame. Incidentally, the shutter and other mechanisms associated therewith are charged by an actuator which is required to always operate in a constant fashion regardless of the change of the frame number. Therefore, the conventional winding devices are generally constructed so that driving power of the driving means is transmitted directly only to the takeup spool to wind up the film thereon, and this moving film is used to drive a sprocket to rotate to a certain degree (necessary to move the film by one frame) by which the shutter is charged. In such winding device, however, as has been described above, the direct transmission of power from the driving source to the takeup spool is combined with the indirect transmission of the driving power to the charging mechanism for the shutter through the film, thereby making unavoidable increase in the complexity of the winding device. Another disadvantage is that so long as film is not loaded, the camera cannot be operated.

In recent years, therefore, it has also been proposed to provide the winding device with a clutch mechanism operating in such a manner that while a certain amount of power from the driving means is transmitted directly to both of the takeup spool and the charging member for the shutter or the like, the transmission of the driving power to the takeup spool is cut off when the film is advanced one frame, thus changing the angle of rotation of the takeup spool depending upon the diameter of the film wound thereon. With such device, the above-mentioned problem that the lack of film leaves the camera in the idle state can also be eliminated. However, even such winding devices of the conventional type have alternative disadvantages, since the clutch mechanism for use in transmitting motion to the film is arranged to be closed or engaged (effective for transmission of the driving power) in response to either an actuation of camera release, or the termination of running down movement of the shutter. That is, in a case where the closing operation of the clutch mechanism is controlled by the release actuation, the actuator for releasing the camera must be designed to move through a longer stroke, or with a stronger force of depression, giving the user an unpleasant impression and increasing the possibility of producing drawbacks such as camera vibration. In the other case where the above-described closing operation of the clutch mechanism is coordinated with the closing operation of the shutter, as the shutter shares the available energy which must be large enough to change over the clutch mechanism, the shutter is apt to bind at the terminal end of the running down movement. Particularly, in an application of this winding device to lens shutter-equipped cameras, there is another disadvantage that because of the small kinetic energy of the shutter blades, the reliability of controlling the changing operation of the clutch mechanism is considerably lowered.

The use of an electric motor as the driving means in such winding device also gives rise to an additional problem. That is, as the output of the motor is drivingly connected to the film transportation mechanism and the shutter charging mechanism, and the current supply to the motor is cut off when each cycle of charging operation is completed, it often happens that the feeding of the film from the cartridge terminates before the last film frame is fully advanced. If so, because of the fixture of the terminal end of the film strip to the supply spool in the cartridge, a further winding of the film is no longer possible, and the motor is braked hard while current flow thereto continues. This causes flow of a far larger current to the motor than when it rotates. Since the batteries used in the cameras are generally of small capacity, the allowance of such large current to flow results in a premature consumption of electrical energy in the battery. Further, when such a situation is permitted to exist for a long time, the motor and battery generate heat, causing accidental damage.

In order to avoid such drawbacks, according to the prior art, upon making sure that the end of feeding of the film has occurred, the operator must manipulate a switch so that the current supply to the motor is cut off. With such construction and arrangement, however, the burden on the operator is increased, the management of the camera is complicated, and, when the necessary operation of the switch is overlooked, the above-described drawback is encountered. To avoid such difficulties in the operation of the camera, there has also been proposed a method of automatically cutting off the current supply to the motor by using, for example, an electrical delay circuit. This circuit is actuated when each cycle of film winding operation starts, and then produces a de-actuating signal for the current supply control switch only when that cycle is not completed within the prescribed time. The employment of this method, however, gives rise to problems in that provision must be made for an electrical control means in the form of the above-described delay circuit, and that the normal operation of the above-described delay circuit must be protected against a loss in the voltage of the battery by using an additional complicated circuit. It is, therefore, not compatible with a battery of small capacity such as is adapted to be accommodated in the camera housing.

SUMMARY OF THE INVENTION

With the foregoing in mind, it is an object of the present invention to provide a winding device for a camera with a clutch mechanism that renders it impossible to transmit the driving power to the spool therethrough when the spool takes up the film by one frame being arranged to establish the power transmission again when the charge member for charging the shutter and the like returns to the initial position, thus eliminating all the above-mentioned drawbacks of the conventional device and improving the reliability of winding control.

Another object of the present invention is to provide a winding device of the type described above which does not unnecessarily use up electrical energy in the battery as the end of film feeding is detected in the form of a change in the output of the clutch mechanism and the current supply to the motor is automatically cut off.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

FIG. 2 is a perspective view of one embodiment of a winding device for a camera according to the present invention;

FIG. 4 is a view similar to FIG. 2 showing the embodiment in a position where only the winding of the film is completed.

DETAILED DESCRIPTION OF THE PREFERRED EMBODIMENTS

Figure 1:
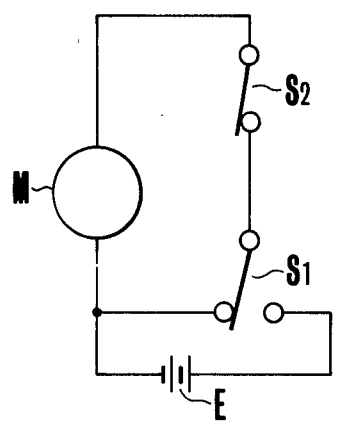
FIG. 1 is a driving circuit diagram with an electric motor as the driving means of the invention.

FIG. 1 shows a motor driving circuit for a camera embodying the present invention. M is an electric motor for performing a film winding and shutter charging operation and E is an electrical power source for the motor M. S1 is a changeover switch controlling the film winding and shutter charging operation. When each cycle of winding operation is completed, the changeover switch S1 is set in a position where the winding of the motor M is short-circuited. When the winding operation is in progress, the electrical power source E is connected to the winding of the motor M. S2 is a normally closed switch arranged to be opened when the end of film feeding is detected as will be seen hereinafter, whereby the current supply to the motor M is cut off.

FIG. 2 shows the construction and arrangement of the main parts of one embodiment of a camera according to the present invention in the film wound up position. Motion of the motor M is transmitted through a pinion 1 affixed to the output shaft thereof, a gear 2 meshing with the pinion 1, and a further gear train G1 to a cutout gear 3. The cutout gear 3 rotates in a counterclockwise direction as viewed in FIG. 2 as the motor M rotates forward. When the gear 3 rotates, a rack 5 meshing therewith is driven to move in a direction indicated by arrow (a), while charging a shutter (not shown) and other mechanisms associated therewith. The cutout gear 3 is provided with a cam disc 4. When in the film wound up position shown in FIG. 2, a groove 4a formed in a portion of the periphery of the cam disc 4 accepts a pawl 7a of a changeover lever 7 under the action of a spring 9. And, at this time, the changeover switch S1 is set by an actuator or end of the changeover lever 7 in the position where the poles of the motor M are short-circuited. The above-described lever 7 is pivotally mounted on a shaft 8. And, when the shutter has run down, a member 10 pushes the lever 7 at one end 7c thereof against the force of the spring 9, whereby the lever is turned about the shaft 8 in the counterclockwise direction. Such movement of the change-over lever 7 causes disengagement of its pawl from the groove 4a of the above-described cam 4, and also causes its actuator end 7b to move the switch S1 to the position where the electrical power source E is connected to the motor M.

On the other hand, motion of the motor M is also transmitted through the pinion 1, gear 2 and a gear train G2 to a gear 21. Underneath the gear 21 there is a gear 22 of smaller diameter formed in unison therewith. This gear 22 meshes with a gear 23 which in turn meshes with a gear 24 and the gear 24 meshes with the gear 25. The gears 22 and 25 are mounted coaxially and rotatably independently of each other. Further arranged coaxially thereto is a clutch disc 26. And, mounted on this clutch disc 26 are the above-described gears 23 and 24. The gears 22 to 25 and the clutch disc 26 form a so-called planetary gear train.

The clutch disc 26 is provided with a saw-tooth like engagement portion 26a in the periphery thereof. When in the illustrated position, a bent engagement piece 35a formed in one end of a clutch lever 35 engages with one of the saw teeth 26a. With the clutch disc 26 latched by the clutch lever 35, it occurs that motion of the motor M is transmitted from the gear 21→gear 22→gear 23→gear 24→gear 25 and therefrom further transmitted through a gear train G3 to a film takeup spool 19.

The clutch lever 35 is pivotally supported on one end 32a of a film feeding end detecting lever 32, and is biased by a spring 34 to turn in a counterclockwise direction, that is, in that direction which brings it into engagement with the clutch disc 26. The lever 32 is pivotally mounted on a shaft 31 and is urged by a spring 33 to turn in a counterclockwise direction until it abuts on a position defining pin 36. Therefore, the bias force of the spring 33 is applied as a constraining force between the clutch disc 26 and the lever 35 through the lever 32. It should be pointed out here that this constraining force is adjusted to be stronger than the torque occurring when the film winding operation is normal, but weaker than the torque resulting from the film feeding end. That is, the kinetic relationship at the periphery of the clutch disc 26 is set forth as follows:

[The torque occurring when in the normal film winding mode] < [The restraining force of the clutch lever 35 by the spring 33] < [The torque occurring when the film is no longer fed]

Upon fulfillment of such kinetic requirements, as will be described later, when in the normal film winding mode, the lever 32 assumes the position of FIG. 2. Then, when the cartridge no longer feeds film, the lever 32 is caused to turn in the clockwise direction against the bias force of the spring 33.

37 is a holding lever for the switch S2 pivotally mounted on a shaft 38 and urged by a spring 39 in a clockwise direction. This lever 37 abuts with its one end 37a on the free end 32b of the lever 32, and its opposite end forms a bent-off portion 37b so that when the lever 32 is in the position of FIG. 2, the normally open switch S2 is pushed and held in the closed position. The end portion 37a of the holding lever 37 has its front edge formed to a recessed portion 37a' so that when the lever 32 changes its position to the clockwise direction, the lever 37 is rotated in the clockwise direction so long as the end portion 32b of the lever 32 drops into this recessed portion 37a'. Again, the end of the bent-off portion 37b is provided with a display member 37c for which is provided a window W in the camera housing (not shown) to display when the film feeding comes to an end. And, when in the position of FIG. 2, the display member 37c cannot be seen through the window W. When the lever 37 is turned in the clockwise direction, the display member 37c is positioned in alignment with the window W.

The clutch lever 35 is, as has been described above, urged by the spring 34 in the counterclockwise direction with its pawl 35a being abutted against the engagement portion 26a of the clutch disc 26. At this time, the opposite end portion 35b of the clutch lever 35 is positioned opposite to a pushing pin 40b provided on one end of a slide 40. The slide 40 has a pair of longitudinally elongated slots 40c and 40c' which respective pins 41 and 41' penetrate, thus being permitted to move in a prescribed range. A spring 42 urges the slide 40 to the left as viewed in FIG. 2. When each cycle of film winding operation is completed, this slide 40 is moved to the right by an actuator lever 16 against the force of the spring 42, while simultaneously turning the clutch lever 35 in the clockwise direction, whereby the clutch lever 35 and the clutch disc 26 are taken out of engagement with each other.

The actuator lever 16 has one end pivotally mounted on a pin 15 which is fixedly mounted on one end of an L-shaped lever 11, with its opposite end provided with an actuator pin 16b for pushing the slide 40 at the end portion 40a. The differential lever 11 is pivotally mounted on a pin 12. The actuator lever 16 and differential lever 11 are urged by a spring 14 having one end trained on a pin 16a provided at the center of the length of the lever 16 so that the actuator lever 16 turns about the pin 15 in a clockwise direction while the differential lever 11 turns about the pin 12 in a counterclockwise direction. One end 11a of this differential lever 11 abuts on a pin 5a provided at a predetermined point of position on the rack 5. Since, in the wound up position of FIG. 2, the rack 5 is returned to the rest position by the spring 6, the differential lever 11 is held in a clockwise deflected position by the pin 5a against the spring 14. On the other hand, the actuator lever 16 is deflected to a counterclockwise direction by a cam disc 17 abutting on the side edge thereof against the bias force of the spring 14. The cam disc 17 is affixed through a shaft 17b to a sprocket 18 which engages with the perforations P of a film F so that when the film F is advanced one frame, it rotates one revolution. Formed in the cam disc 17 is a projected portion 17a at such a location that when in the wound up position of FIG. 2, the projected portion 17a abuts against the actuator lever 16.

It is noted that 43 is a resetting slide movably mounted and guided by pins 44 and 44' engaging in respective elongated slots 43c and 43c', and urged by a spring 45 to move in a leftward direction. After all the film frames have been exposed, when the camera is switched to the rewinding mode, the slide 43 is moved to the right, whereby the holding lever 37 is turned in a counterclockwise direction in engagement with a pushing pin 43a, and at the same time the slide 40 is moved to the right in engagement with a pushing pin 43b.

Figure 3:
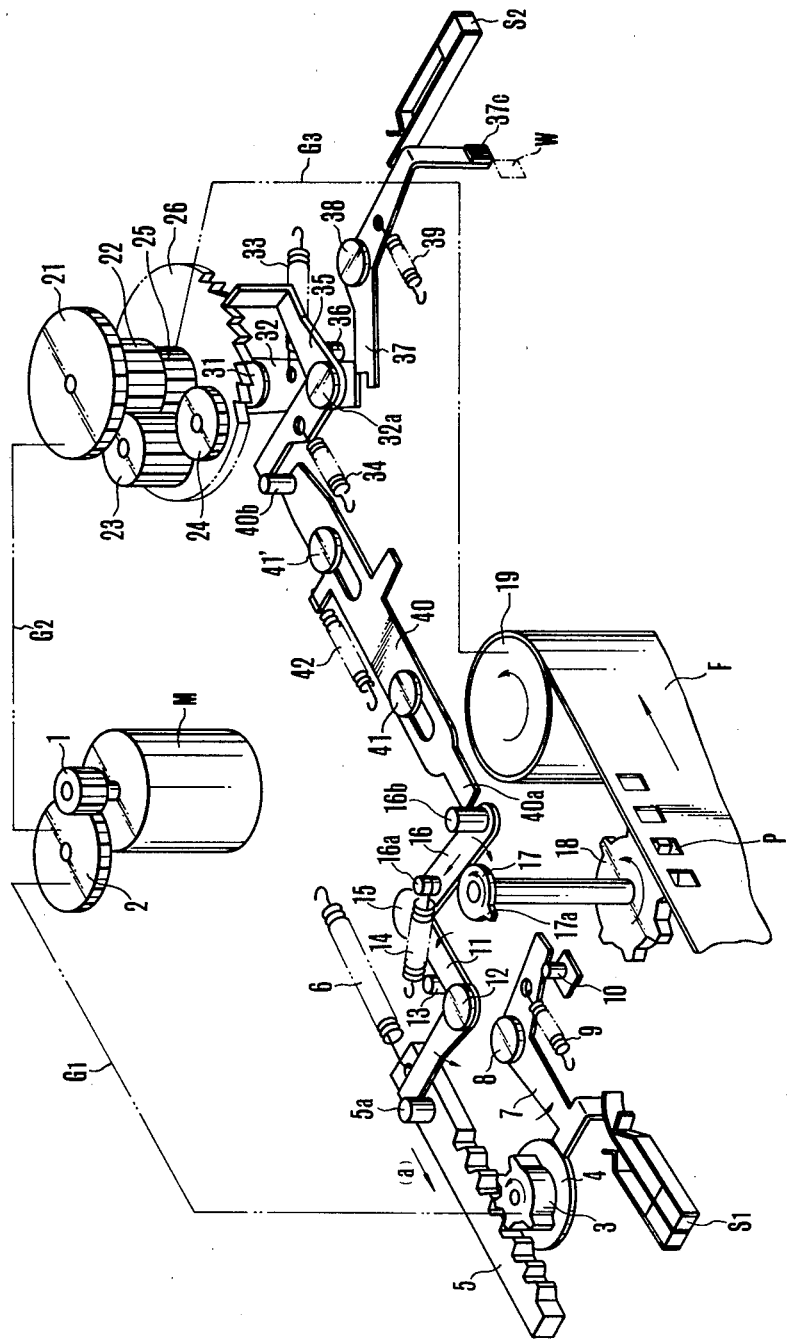
FIG. 3 is a view similar to that of FIG. 2 showing the embodiment in a winding start position.

In operating the camera of such construction, when the shutter is closed, the member 10 turns the changeover lever 7 in the counterclockwise direction, whereby the pawl 7a is disengaged from the groove 4a, and at the same time the switch S1 is moved to supply the motor M with current from the battery E. Then, the motor M starts to rotate. As the motor M rotates, the cutout gear 3 is rotated and, as shown in FIG. 3, the rack 5 is moved in the direction of arrow (a), whereby the shutter (not shown) is charged. At the same time, motion of the motor M is also transmitted to the spool 19. As the spool 19 rotates, the film F is wound up on the spool 19. Such movement of the film F causes counterclockwise rotation of the sprocket 18 in engagement with the perforations P of the film F. As this sprocket 18 rotates, the cam disc 17 is also rotated to move the projected portion 17a away from the lever 16, permitting the actuator lever 16 to turn about the shaft 15 in the clockwise direction under the action of the spring 14. On the other hand, as the rack 5 moves, the differential lever 11 is turned about the shaft 12 in the counterclockwise direction under the action of the spring 14 until it abuts against the position defining pin 13. Such movement of the differential lever 11 causes leftward movement of the actuator lever 16 so that the actuator pin 16b is positioned in alignment with the end portion 40a of the slide 40 as shown in FIG. 3. Then, when the film F is advanced by one frame, the cam disc 17 rotates one revolution, bringing its projected portion 17a into abutting engagement against the side edge of the lever 16 again and then turning the lever 16 in the counterclockwise direction as shown in FIG. 4. Therefore, the actuator pin 16b pushes the slide 40 at the end 40a to the right against the force of the spring 42, which in turn causes the clutch lever 35 to turn about the shaft 32a in the clockwise direction against the force of the spring 34 as the pushing pin 40b is acted on one end 35b of the clutch lever 35. As a result, the pawl 35a of the clutch lever 35 is taken out of engagement with the toothed portion 26a of the clutch disc 26. Then, the clutch disc 26 is rendered freely rotatable so that the driving torque of the motor M is no longer transmitted to the gear train G3. Thus, the film F is stopped from being further wound up.

On the other hand, the cutout gear 3 continues rotating. Then, when the shutter is charged, the cutout portion of the gear 3 comes to alignment with the rack 5, whereupon the rack 5 is returned to the position of FIG. 2 by the action of the spring 6. As a result, the detent pawl 7a of the changeover lever 7 drops in the groove 4a of the cam disc 4, permitting the switch S1 to be moved to the position of FIG. 2 again where the motor M is de-energized. Meanwhile, as the rack 5 returns to the position of FIG. 2, the differential lever 11 is turned in the clockwise direction, whereby the actuator pin 16b is moved away from the path of movement of the end portion 40a of the slide 40. Then, the slide 40 is returned to the position of FIG. 2 under the action of the spring 42, and the clutch lever 35 is also turned in the counterclockwise direction by the force of the spring 34 and engages with the clutch disc 26 again. Thus, the camera is made ready to the next exposure for one film frame.

It is noted that though the foregoing explanation is valid provided that the film F is loaded in the camera, it is valid even without the loading of the film F in the camera in that the cutout gear 3 operates similarly. Therefore, charging of the shutter through the rack 5 is effected likewise as in the above-described case.

Figure 5:
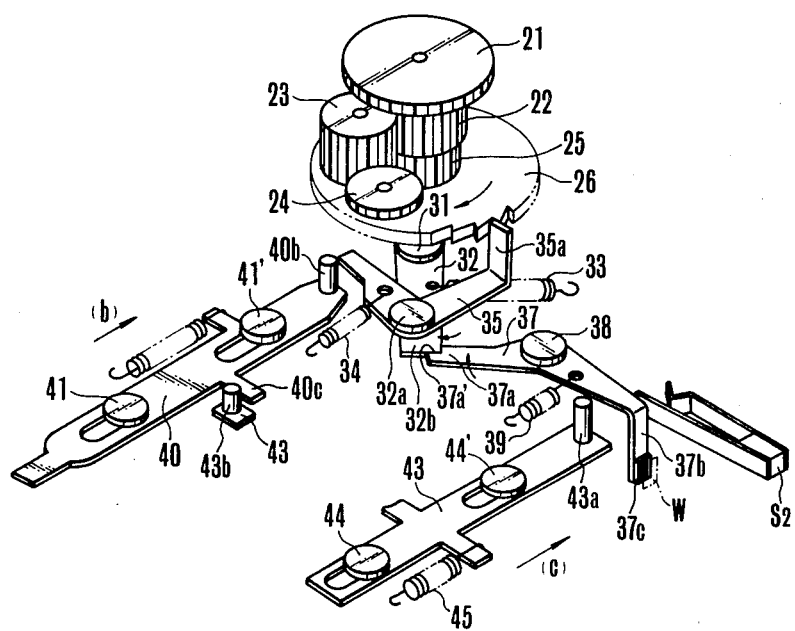
FIG. 5 is a view similar to FIG. 2 wherein the embodiment is shown in a position where the winding of the film is stopped midway.

Now assuming that, in the camera of the above-described construction, the cartridge no longer feeds the film, then because of the fixture of the terminal end of the film to the hub of the cartridge, the spool 19 cannot further rotate and is stopped leaving the motor M supplied with current. Therefore, a high torque is applied to the gear train in the winding up system. At this time, however, the clockwise torque of the clutch disc 26 is transmitted through the clutch lever 35 to the lever 32. Since the bias force of the spring 33 for the lever 32 has a smaller value than that torque occurring when the film is no longer fed, the lever 32 is turned in the clockwise direction against the force of the spring 33 as shown in FIG. 5. Then, along therewith, the holding lever 37 is turned in the clockwise direction until its recessed portion 37a' engages with the end portion 32b of the lever 32. As a result, the switch S2 is opened, thus cutting off the current supply to the motor M. And, the display member 37c appears in the window W, informing the operator of the fact that there is no more film.

It is noted that when the camera is switched from this winding mode to the rewinding mode, the resetting slide 43 is moved in a direction indicated by arrow (c). As the slide 43 moves in the (c) direction, the slide 40 is moved in the direction of arrow (b). Therefore, the pushing pin 40b turns the clutch lever 35 in the clockwise direction, whereby the detent pawl 35a is disengaged from the clutch disc 26. Further, the pin 43a provided on the slide 43 turns the holding lever 37 in the counterclockwise direction, whereby the lever end 37a' is disengaged from the lever end 32b. Then the film feeding end detecting lever 32 is returned to the position of FIG. 2 by the action of the spring 33, and the holding lever 37 is also returned to the position where the switch S2 is closed. Therefore, the display member 37c disappears from the window W. Thus, the camera is reset from the filming end detecting mode by rewinding the film.

As has been described in detail, the present invention contemplates the use of the charge member for the shutter in changing over the clutch mechanism with the advantage that there is no need to use surplus driving power and activation as compared with a conventional device which cooperates with the release actuator or with the shutter blades, thus eliminating the drawbacks of the conventional device, whereby a positive operation can be expected. Another advantage of the invention is that since the current supply to the driving means, that is, the motor is controlled in such a manner that when the spool is stopped midway by the shortage of the film in the cartridge, the resultant increase in the torque of the clutch mechanism is detected to cut off the current supply to the motor. Thus, there is eliminated the possibility of occurrence of an accident due to the wasteful consumption of electrical energy in the battery and heat generation which would otherwise result from the flow of an excessive current to the motor when the film is no longer fed. A further advantage of the invention is that since a display representing the film end is presented at the same time when the current supply to the motor is interrupted, the photographer is not only informed of the fact that the film has to be replaced, but is also able to clearly discriminate that fact from an accidental stoppage of the current supply due to, for example, breakage of the wiring. A further advantage of the invention is that since the current supply to the motor is controlled by mechanical means, the provision of a delay circuit and a switching circuit as in the conventional device is not necessary and therefore the premature consumption of the battery can be avoided. Also, the electrical energy in the battery can be effectively used with the limitation being only for essentially required operation such as film winding. Another advantage of the invention is that since the film end is detected by utilizing the force exerted in the driving torque transmission mechanism when the spool is stopped midway, the structure of the film end detecting mechanism can be simplified.

While specific embodiments of the invention have been shown and described in detail to illustrate the application of the inventive principles, it will be understood that the invention may be embodied otherwise without departing from such principles.

What is claimed is:

1. A winding device for a camera including:
    (a) driving means;
    (b) a spool for winding film;
    (c) transmission means for transmitting the driving power of said driving means to said spool;
    (d) charge means driven by the driving power of said driving means for charging an exposure determining mechanism of said camera, said charge means returning to an operation starting position when a charging of said exposure determining mechanism of the camera is completed and the driving power of said driving means is not transmitted; and
    (e) changeover means responsive to winding of film by one frame on said spool for moving said transmission means to a transmission disabled position and responsive to return of said charge means to an operation start position for moving said transmission means to a transmission enabled position.

2. A winding device for a camera including:
    (a) driving means;
    (b) a spool for winding film;
    (c) transmission means for transmitting the driving power of said driving means to said spool;
    (d) charge means driven by the driving power of said driving means for charging an exposure determining mechanism of said camera; and
    (e) changeover means responsive to winding of film by one frame on said spool for moving said transmission means to a transmission disabled position and responsive to return of said charge means to an operation start position for moving said transmission means to a transmission enabled position, said changeover means including a first lever for changing over said transmission means to the transmission disabled position and to the transmission enabled position, a cam disc rotating in correspondence with winding of said film, and a second lever which is actuated by said cam disc and which actuates said first lever only when the charge means is moved from the operation start position.

3. A device according to claim 2, wherein said transmission means comprise a planetary gear train.

4. A winding device for a camera including:
    (a) winding means;
    (b) a spool for winding film;
    (c) transmission means for transmitting the driving power of said driving means to said spool;
    (d) charge means driven by the driving power of said driving means for charging a shutter and other exposure determining mechanisms of said camera;
    (e) changeover means responsive to winding of film by one frame on said spool for moving said transmission means to a transmission disabled position and responsive to return of said charge means to an operation start position for moving said transmission means to a transmission enabled position; and (f) switch means causing said driving means to operate when an exposure is terminated, and causing stoppage of said driving means from further operation when the exposure determining mechanism of said camera is charged.

5. A device according to claim 4, wherein said driving means is an electric motor.

6. A winding device for a camera including:
(a) driving means;
(b) a spool for winding film;
(c) transmission means for transmitting the driving power of said driving means to said spool;
(d) first switch means causing said driving means to operate when an exposure is terminated, and causing stoppage of said driving means from further operation when an exposure determining mechanism of said camera is charged;
(e) second switch means responsive to an increase in the torque generated in said transmitting means for stopping said driving means from further operation; and
(f) holding means for holding said second switch means in a position where the operation of said driving means is stopped, said holding means being actuated by a rewinding operation to release such condition.

7. A winding device for a camera including:
(a) driving means;
(b) a spool for winding film;
(c) transmission means for transmitting the driving power of said driving means to said spool;
(d) first switch means causing said driving means to operate when an exposure is terminated, and causing stoppage of said driving means from further operation when an exposure determining mechanism of said camera is charged;
(e) second switch means responsive to an increase in the torque generated in said transmitting means for stopping said driving means from further operation;
(f) charge means driven by the driving power of said driving means for charging the exposure determining mechanism of said camera; and
(g) changeover means responsive to winding of the film by one frame on said spool for moving said transmission means to a transmission disabled position and responsive to return of said charge means to an operation start position for moving said transmission means to a transmission enabled position.

8. A device according to claim 7, wherein said changeover means includes:
(a) a first lever to change over said transmission means to the transmission disabled position and to the transmission enabled position;
(b) a cam disc rotating in response to winding of the film;
(c) a second lever arranged to be actuated by said cam disc, said lever actuating said first lever only when said charge means is moved from the operation start position; and
(d) a third lever swingingly supporting the center of rotation of said first lever, with operation of said third lever switching said second switch means.

9. A winding up device for a camera according to claim 8 further including:
a fourth lever arranged to engage with said third lever, said fourth lever being actuated in response to rewinding operation thereby to release said engagement.

10. A device according to claim 9, wherein said fourth lever operates to provide a display indicating the end of said film.

* * * * *